United States Patent
Whitaker

(10) Patent No.: US 7,642,471 B2
(45) Date of Patent: Jan. 5, 2010

(54) FLY-BY-BOX

(75) Inventor: Milan M. Whitaker, Fairhaven, MA (US)

(73) Assignee: Milan Whitaker, Fairhaven, MA (US)

( * ) Notice: Subject to any disclaimer, the term of this patent is extended or adjusted under 35 U.S.C. 154(b) by 99 days.

(21) Appl. No.: 11/973,616

(22) Filed: Oct. 10, 2007

(65) Prior Publication Data

US 2009/0094911 A1   Apr. 16, 2009

(51) Int. Cl.
*H02G 3/08* (2006.01)
(52) U.S. Cl. .................... 174/481; 174/480; 174/50; 174/53; 174/58; 220/3.2; 220/3.3; 52/220.1
(58) Field of Classification Search ............... 174/480, 174/481, 50, 53, 57, 58, 503, 559; 220/3.2–3.9, 220/4.02; 248/906; 52/220.1, 220.7, 220.2
See application file for complete search history.

(56) References Cited

U.S. PATENT DOCUMENTS 3,927,785 A * 12/1975 Kinney et al. ............... 174/53
4,612,412 A * 9/1986 Johnston ..................... 174/57
5,841,068 A * 11/1998 Umstead et al. ............. 174/58
6,057,509 A * 5/2000 Simmons .................... 174/53
7,075,004 B1 * 7/2006 Gretz ......................... 174/50
7,087,836 B2 * 8/2006 Archer et al. ............... 174/50
7,109,414 B2 * 9/2006 Reynolds .................... 174/50
7,141,736 B2 * 11/2006 Plankell ..................... 174/50

* cited by examiner

Primary Examiner—Angel R Estrada

(57) ABSTRACT

A non-metallic electrical box, composed of a hard and durable plastic material, molded and shaped into a housing of two sections, that when installed onto a wall stud, becomes a receptacle for installing an electrical switch, outlet or other electrical device in the first section, and the second section, being that part of the box that attaches to the stud, becomes a cavity or channel by which other unrelated wiring can pass through the box along the center line of the stud in a neat and more efficient and direct manner, as opposed to the currently acceptable practice of looping the wires around the box.

6 Claims, 5 Drawing Sheets

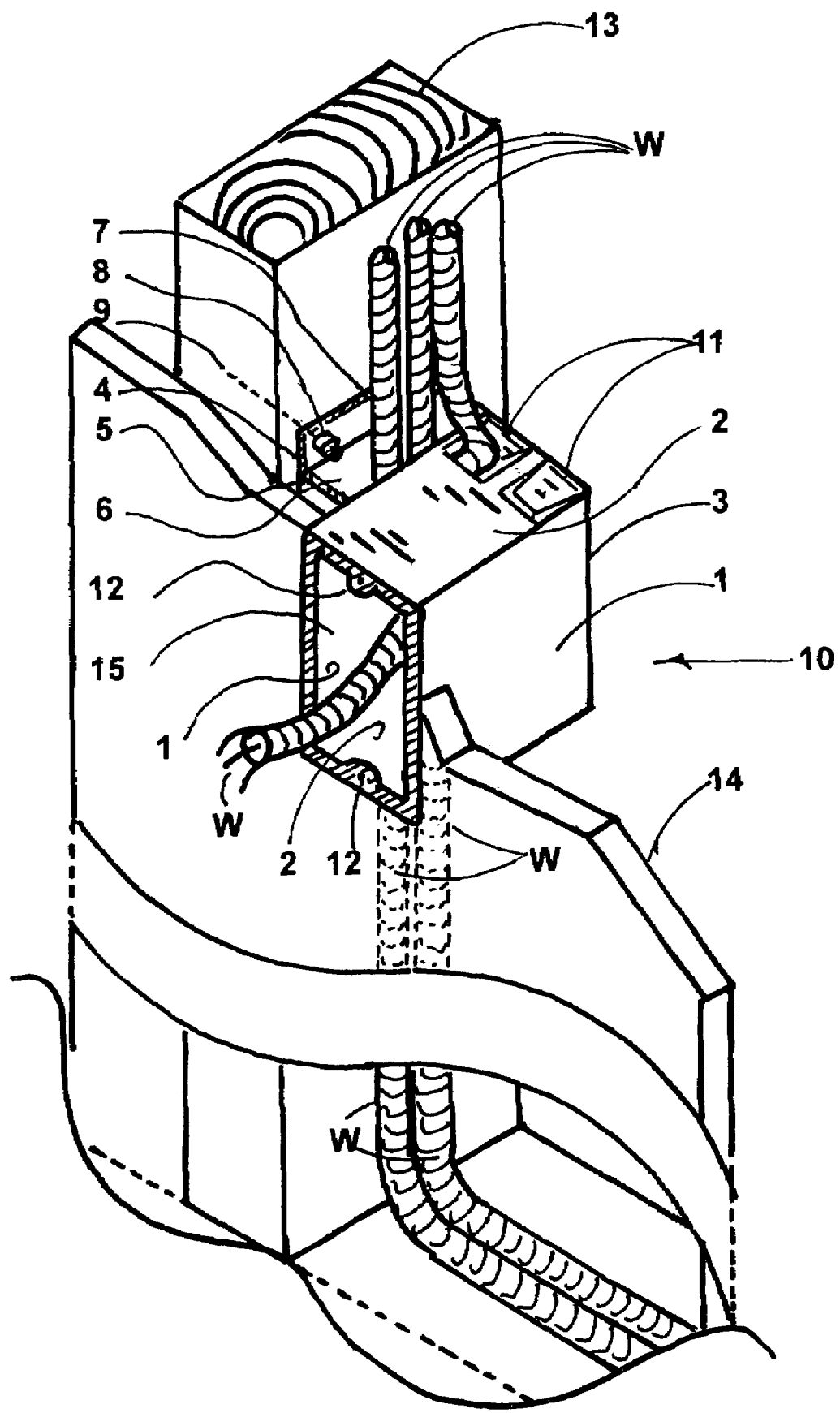

FLY-BY-BOX

BACKGROUND OF THE INVENTION

1. Field of the Invention

This invention relates, generally, to molded Polyvinyl Chloride (PVC) or other Underwriters Laboratories Inc. (UL) approved hard plastic electrical switch or outlet boxes, and more particularly to a box that houses a first section for a standard electrical device and in a juxtaposed position to a second section, that when attached to a wall stud, allows for the passage of other unassociated wiring, through the electric box, and vertically along the centerline of the stud providing a neater and more direct run as opposed to the presently accepted practice of looping the wiring around the box. For simplistic purposes, the drawings and following specifications will show the first section of the dual purpose box as a single outlet, this does not preclude the first section as being two, three or four "gang" compartments.

2. Prior Art

Patents of interest in this field are generally that of electrical device boxes of many configurations, sizes, compositions and attachment means. The U.S. Pat. No. 6,147,304 to Doherty, U.S. Pat. No. 5,598,998 to Lynn and U.S. Pat. No. 5,574,256 to Cottone, all relate to boxes housing both electrical as well as communication components. Other patents, such as that of U.S. Pat. No. 6,365,831, are concerned with cable staying devices within a particular electrical box.

No PATENTED electrical boxes, having a similar embodiment and intended use as that of this invention, were discovered. To those skilled in the art, this invention will be obvious and unique as to it's originality.

BRIEF SUMMARY OF THE INVENTION

The invention, AKA the FLY-BY-BOX, simply stated, is a double sectioned molded non-metallic monolithic juxtaposed electrical box designed so that when attached to a vertical wall stud, accommodates a standard electrical device as well as allowing for other unrelated wiring to pass neatly and uninterrupted through the box.

BRIEF DESCRIPTION OF THE DRAWINGS

Drawing 1/5.

Drawing 2/5.

Drawing 3/5.

Drawing 4/5.

Drawing 5/5, FIG. 6, is a perspective view intended to show the preferred embodiment of the invention installed in a typical situation.

DETAILED DESCRIPTION OF THE DRAWINGS

Figure 1:
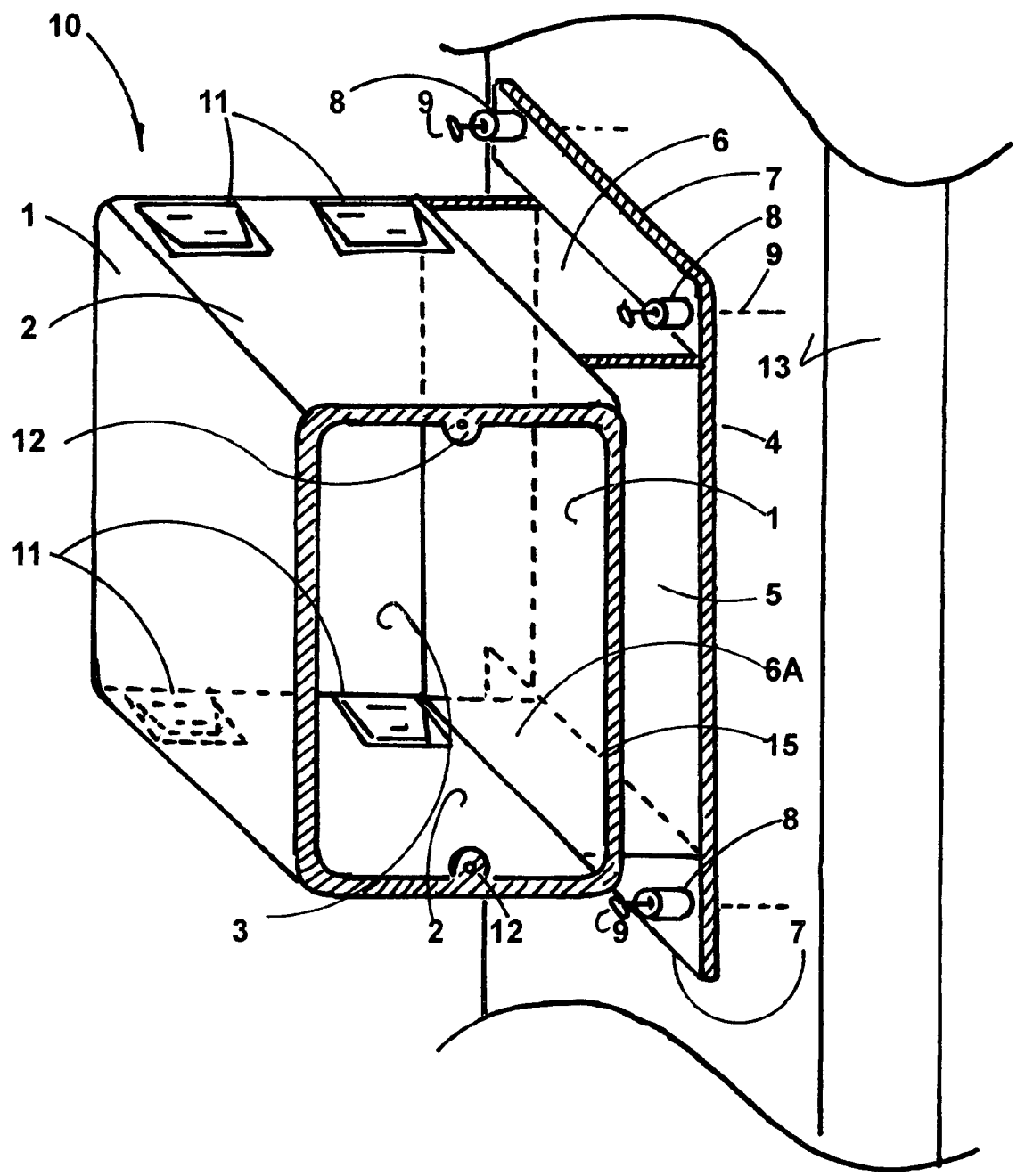
FIG. 1, is a perspective view of the specific embodiment of a new dual sectioned electrical box, of the invention, fastened to a vertical columnar member.
Figure 2:
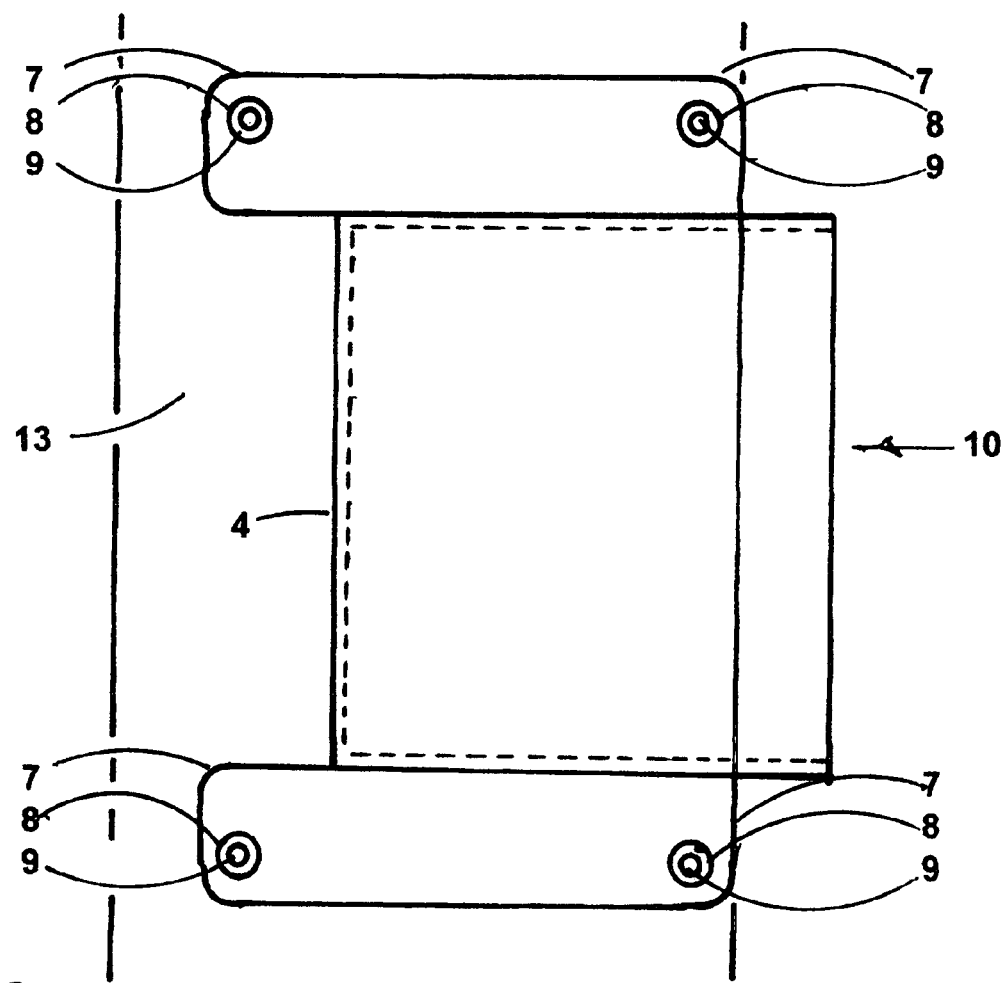
FIG. 2, is a side or horizontal view of the invention and it's attachment means to the vertical columnar member.
Figure 3:
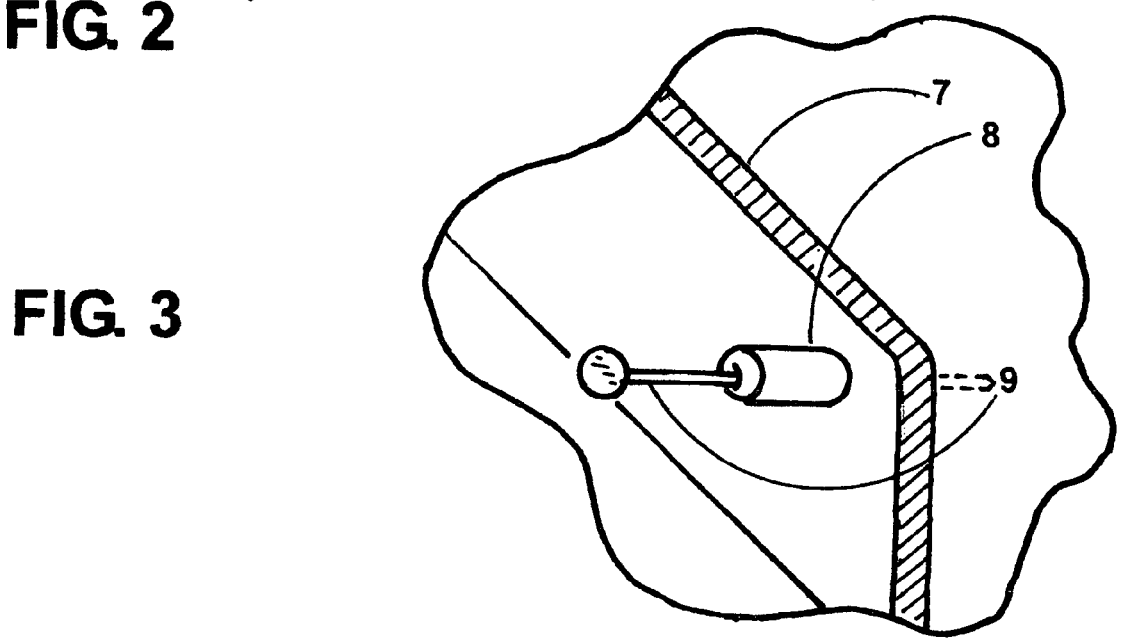
FIG. 3, is a fragmented view of one of the four fastening devices that attach the electrical box to the columnar member.
Figure 4:
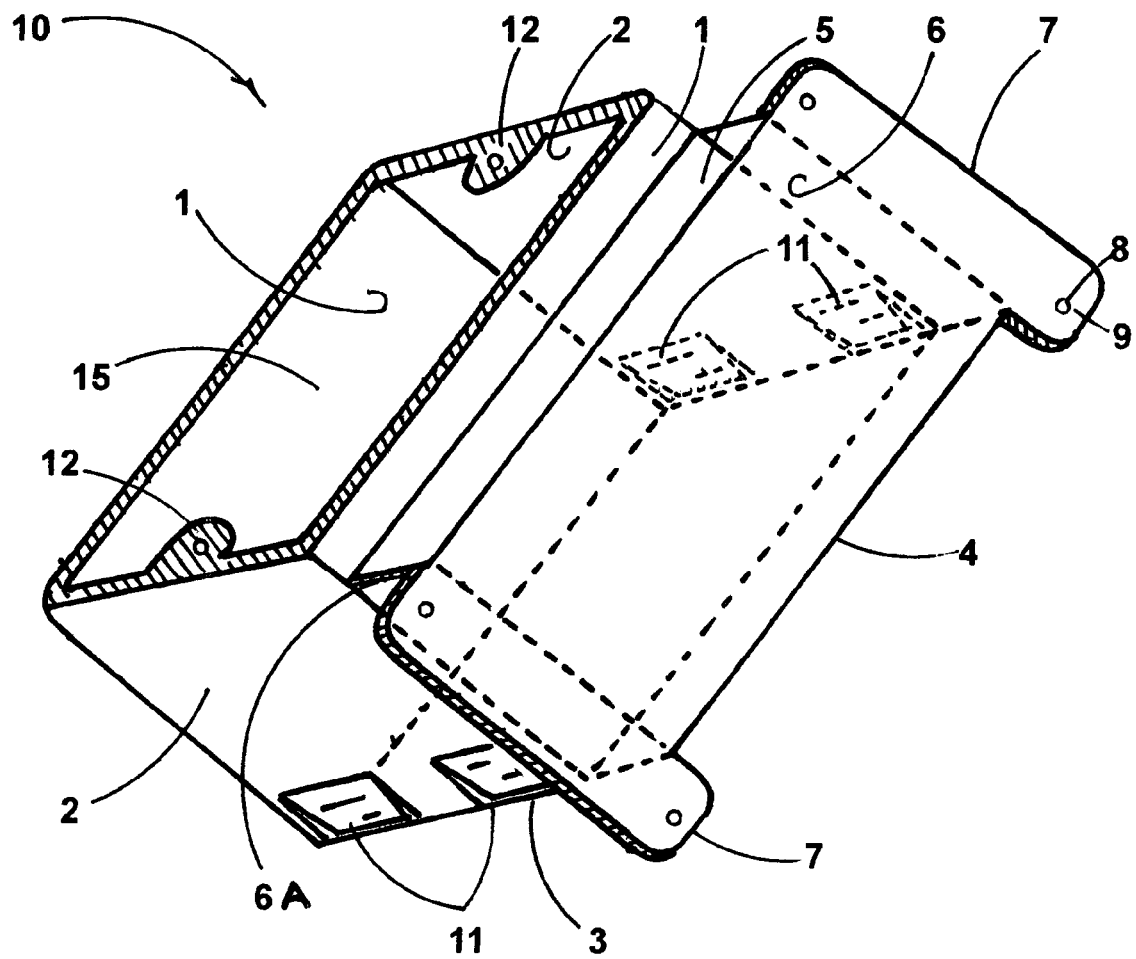
FIG. 4, is a perspective view showing the electrical device section, the wiring cavity and the configuration of the side panel that attaches to the columnar member.
Figure 5:
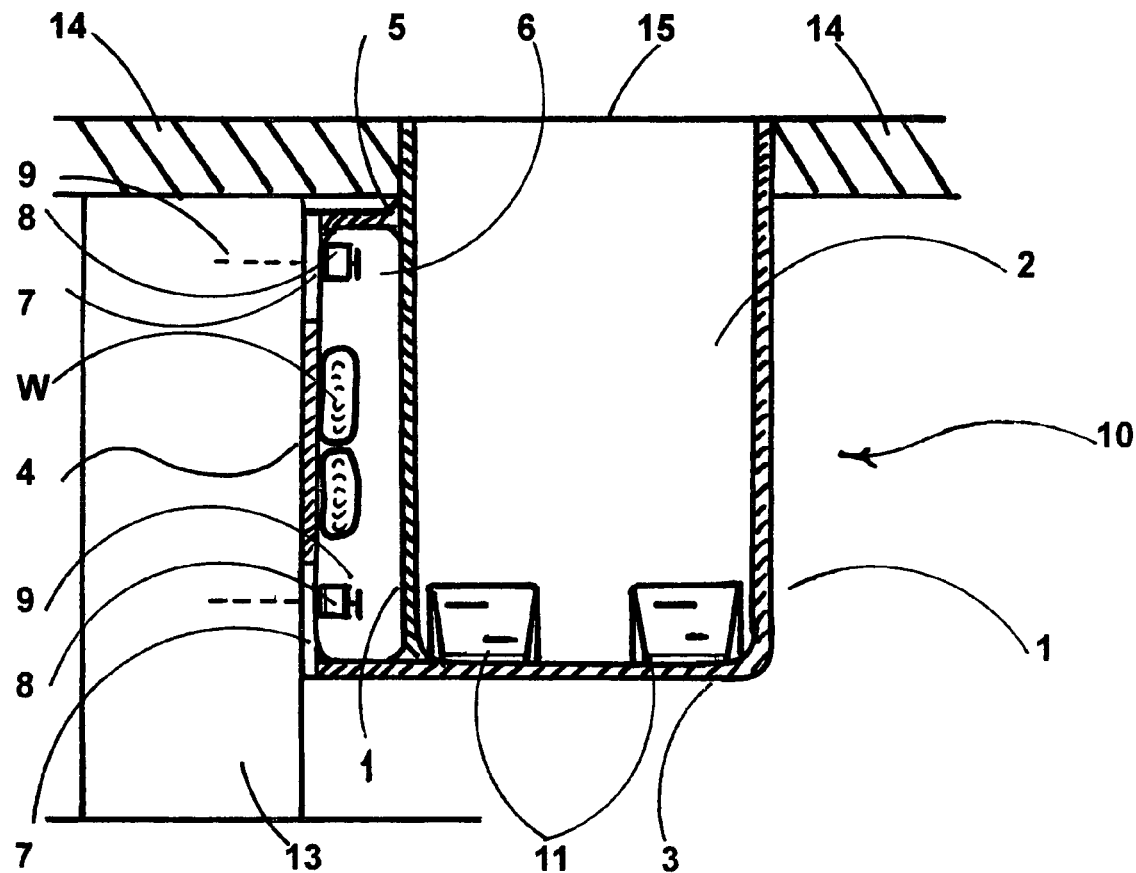
FIG. 5, is a top view of the invention showing the outlet or switch section and the cavity in which the other wiring passes through the box.

Reference is made to DRAWINGS 1/5, FIG. 1, detailing the preferred embodiment of the invention referenced as 10. Shown is a two section juxtaposed electrical box 10, with a plurality of panels. The outlet or switch section, referred to as the first section, of the two section box 10, has vertical left and right opposing parallel panels 1, molded monolithically to vertical rear panel 3, which also extends across to the second section to vertical panel 4 of the second section of box 10. Panel 4, of the second section of box 10, being parallel in relationship to left and right panels 1, of the first section of box 10. FIG. 1, and FIGS. 2 & 3, shows the preferred embodiment of panel 4, with flanges 7, grommets 8, and nails or screws 9, for attachment to columnar member or stud 13; Top and bottom horizontal panels 2, of the first section being molded to said side vertical panels 1, and to vertical rear panel 3; top and bottom panels 2, each have two cable holding hinged tabs at the rear of said panels 2. Rear panel 3, left and right panels 1, and top and bottom panels 2, are monolithically molded together to form box 10, with an open front face 15; Open face 15, of box 10, incorporates two tabs 12, for screws to attach an electrical device within box 10; The second section of the two section box 10, which allows for the passage of other wiring along the vertical plane of columnar member 13 (wall stud), is also made up of a multiplicity of planar surface panels and molded monolithically and juxtaposed to create the second section of box 10; Panel 5, of the second section of box 10, is a vertical front surface recessed back from the open face 15, of the first section of box 10, and molded to right panel 1, of the first section and to panel 4, of the second section of box 10. It must be noted that the front panel 5 of the second section of box 10, is recessed to receive wallboard or other finish materials. Panel 1, the common dividing partition of both first and second sections of box 10, provides for the separation necessary to complete box 10, into a complete housing that can accommodate a standard electrical device in the first section and the means to which other electrical wiring can uninterruptedly pass through the second section of box 10, through the open top face 6, along the vertical centerline of stud 13, and through the open bottom face 6A, when box 10, is attached to stud 13. Box 10, as shown, is attached to stud 13, using a nail 9, in each of the four corners of flanges 7, of panel 4, through fixed grommets 8; FIG. 2, on drawing 2/5, shows the configuration of panel 4, of box 10, and method of attaching said panel 4, with grommets 8, and nails 9, at the four corners of flanges 7. FIG. 3, is a fragmented or blown up view of flange 7, grommet 8, and nail 9. FIG. 4, of drawing 3/5, is another perspective view of box 10, showing side panels 1, end panels 2, rear panel 3, bottom panel 4, with flanges 7, containing grommets 8, and nails 9, open faces 6, and 6A, hinged tabs 11, and tabs 12, all comprising a two section box molded into a unique single unit with a dual purpose. FIG. 5, drawing 4/5, is a top or aerial view of box 10 shown attached to stud 13, at panel 4, with grommets 8, and nails 9, penetrating through flange 7, into stud 13; Shielded wiring W can be seen passing through the secondary section of open face 6, of box 10, which is separated from the first section of box 10, by a common intermediate panel 1, and common rear panel 3, and front panel 5; Top panel 2, with two hinged cable tabs 11, and remaining side panel 1, comprise box 10; The front panel 5, of the secondary section, or pass through cavity, is shown recessed rearward to that of the first section of box 10, for receiving finish material 14, around the open face of the box 10. FIG. 6, drawing 5/5, is a perspective view of the preferred embodiments of the electrical box 10, of FIG. 1, shown in use when mounted to a stud according to the specifications as set forth herein. Said dual purpose box 10, is shown attached by grommets 8, and nails 9, through flanges 7, top and bottom of attaching panel 4, to stud 13, (only one fastener can be seen in this view); Cables W, can be seen penetrating vertically and independently through the open top 6, of the cavity created by perpendicular side panels 4, and 1, and perpendicular end panels 3, and 5; The device section of box 10, is created by top and bottom parallel panels 2, similar in that they contain two hinged tabs each, and are of the same dimension; Right side panel and parallel intermediate panels 1, rear panel 3, and open face 15, comprise the box 10; A cable W, enters through one of the two hinged tabs 11, on the top of panel 2, of said box 10, and feeds an electrical device, not shown, but which is secured by screws in the tabs 12, of the open face designated as 15.

SUMMARY AND SCOPE OF THE INVENTION

It is the intent of the inventor to produce a new and substantially different electric box. It is also the intent of the inventor to create a dual compartment electrical box that can accommodate standard electrical devices and cover plates, and an attached cavity to allow other wiring, unrelated to the adjacent receptacle, to pass through the box. It is also the intent to produce a dual purpose electrical box that is easy to use. It is also the intent of the inventor to produce a dual section electrical box that will meet all the criteria and requirements of the Underwriter Laboratory Standards. Although the description above contains many specificities relative to my claimed invention, these should not be construed as limiting the scope of the invention but to simply provide illustrations of the presently preferred embodiments of this invention, for example: this invention, with its numerous specifications as to the assembly, might be altered with respect to its dimensions and materials and continue to be within the scope of this invention. Modifications may occur by those skilled in the art, however those minor modifications are intended to be within the scope of this invention.

I claim:

1. A dual section electrical box comprising: a housing having a first section and a second section; said first section of said housing having a top panel, a bottom panel, a right side panel, a left side panel and a rear panel; each said side panel of said first section being parallel to each other and molded to said top panel, to said bottom panel and to said rear panel to define a first enclosure with an open front face; said second section of said housing having a rear panel, a front panel, and a right side panel; said rear panel and said front panel being parallel to each other and molded to said right side panel, and to said right side panel of said first section to define said second section with an open top face and open bottom face; said first section of said housing juxtaposed in direct relationship with respect to said second section; said first section and said second section of said housing, being molded in an integral relationship, are separated from each other by said right side panel of said first section, being the common panel between said first section and said second section of the electrical box; wherein said right side panel of said second section is longer than said first section; said right side panel of said second section extends above said open top face and below said open bottom face of said second section; extended ends of said right side panel of said second section utilize small grommets, and nails through said grommets, in each of the four corners of said right side panel of said second section, to fasten said electrical box to a stud.

2. The electrical box of claim 1 wherein said open front face of said first section incorporates small tabs for fastening an electrical outlet or switch as well as an electrical cover plate.

3. The electrical box of claim 2 wherein said top and bottom panels of said first section incorporate hinged cable stays to secure a wiring within said first section of this invention.

4. The electrical box of claim 3 wherein said front panel of said second section is recessed rearward to that of said first section to allow for a wallboard or other finish material.

5. The electrical box of claim 4 wherein said first and said second section are constructed of a Polyvinyl Chloride or other hard plastic material.

6. The electrical box of claim 5 wherein said first section of said box being a receptacle for a electrical device and cover; said second section of said electrical box being a pass through for wiring, unrelated to said electrical device in said first section, to pass through said open top face of said second section and out through said open bottom face of said second section of said electrical box.

* * * * *